Figure 1:
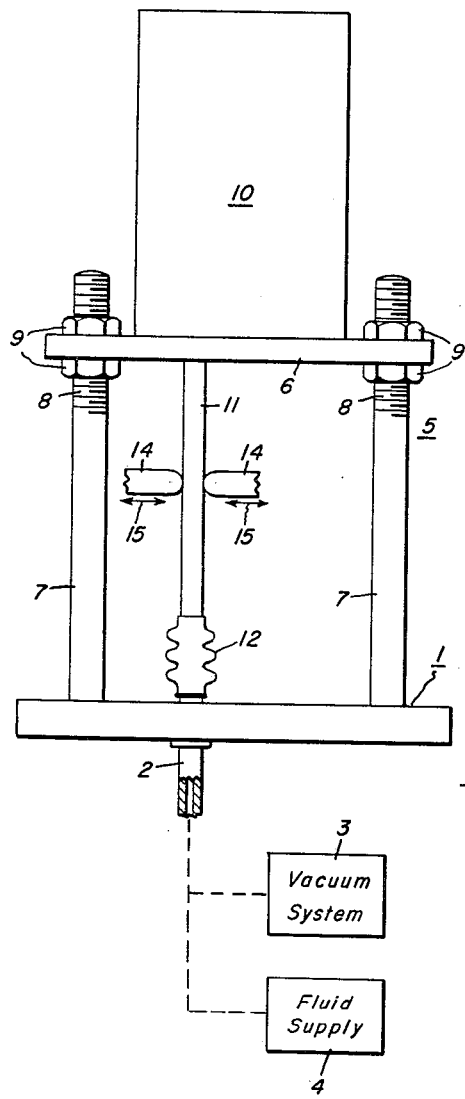

Aug. 25, 1964   A. W. COOLIDGE, JR., ETAL   3,145,465
TUBULATION SEALING APPARATUS AND METHOD
Filed Aug. 24, 1961

Inventors:
Arthur W. Coolidge, Jr.;
Marion J. Slivka,
by *Philip L. Schlamp*
Their Attorney.

United States Patent Office 3,145,465
Patented Aug. 25, 1964

3,145,465
TUBULATION SEALING APPARATUS AND METHOD
Arthur W. Coolidge, Jr., and Marion J. Slivka, both of Scotia, N.Y., assignors to General Electric Company, a corporation of New York
Filed Aug. 24, 1961, Ser. No. 133,695
8 Claims. (Cl. 29—481)

This invention relates to the sealing of containers and pertains more particularly to an improved apparatus and method for sealing tubulations connected to containers.

In various arts such, for example, as the electric discharge device art, the operating components of a device are contained in an envelope or container which is either evacuated or contains a particular gaseous atmosphere. In the manufacture of such devices it is necessary to seal the envelope and often this is accomplished through the agency of a tubulation suitably attached as an appendage to the envelope.

The tubulation is adapted for having the envelope exhausted or gas charged therethrough following which the envelope is sealed by pinching off the tubulation or bringing together in a hermetically sealed manner the opposed walls of the tubulation. In many cases the tubulation is metallic and formed, for example, of a relatively soft or malleable metal, such as copper. The pinch-off operation is effected by apparatus including a pair of opposed metal clamping jaws adapted for effecting a hermetic seal by crushing or compressing the tubulation until the walls thereof come together and are fused by cold-welding in a vacuum-tight joint. Thereafter the excess portion of the tubulation is removed.

It has been found that when a tubulation is sealed in the above-described manner, the device bearing the tubulation should be removed from the apparatus including the clamping jaws with a tensile force directed axially relative to the longitudinal axis of the tubulation. Otherwise, stresses are introduced at the cold weld region of the pinch off which can cause tearing at the weld region and thereby result in leaks or weakened seals prone to leakage during usage. When the device to be sealed is relatively small the mentioned required axial tensile force can be applied relatively easily manually. With devices which are substantially large and heavy it has heretofore been the practice to employ certain lifting aids in order to apply the required axial tensile force. For example, apparatus employing the principles of counterweight and hoists have been employed to lift the device axially away from the clamping jaws after pinch off of the tubulation. For some devices this form of appartus has been effective. However, it was found that when the device being sealed was of substantial weight such, for example, as in excess of 10 pounds, the counterweight and hoist apparatus becomes unwieldy in operation. Also, such apparatus tends to introduce other than axially directed stresses in the tubulation which can adversely affect the seal in the pinched off region. Specifically, substantial laterally directed stresses are introduced which tend to rupture, as by tearing, or to weaken by attenuation the thin metal walls of the tubulation near the point of pinch off. This can either cause leakage during manufacture and necessitate rebuilding of the device to incorporate a new tubulation and repetition of the manufacturing process including the tip-off operation, or, it can result in a weakened seal prone to failure during operating life and, thereby, possibly causing shortened tube life. Additionally, the tendency for the above-described difficulties to result has been found to increase with the size and weight of the device being sealed in view of the fact that in the manufacture of the larger heavier devices there is a tendency for resultant laterally directed stresses to be larger and therefore more capable of creating damaging effects on the thin-walled sections of the pinched off tubulation. Additionally, the larger tubes are generally more costly and thus any leakage resulting in the manufacture thereof or subsequently during usage can be costly to the manufacturer and the purchaser, respectively.

Accordingly, a primary object of the present invention is to provide a new and improved apparatus and method for sealing devices including tubulations.

Another object of the present invention is to provide a new and improved apparatus and method adapted for effecting improved and more reliable sealing of a tubulation in a manner which is relatively more simple and less costly than heretofore employed.

Further objects and advantages of the invention will become apparent as the following description proceeds, and the features of novelty which characterize the invention will be pointed out with particularity in the claims annexed to and forming part of this specification.

In carrying out the objects of the invention, there is provided apparatus including an adjustably positionable support platform for holding a device including a tubulation to be pinched off. Operating means, such as a vacuum system or a fluid source, are fixedly positioned relative to the platform. A conduit is provided for making a connection between the tubulation and the mentioned system. The conduit is connected to the tubulation by an axially and laterally flexible connector. When attached to the tubulation prior to pinch-off, the connector is axially extended and provides a substantially axial force being applied to the tubulation and directed away from the device carrying the tubulation and supported on the mentioned support platform. A pair of clamping jaws are provided between the support platform and flexible connector and when operated are adapted for pinching off the tubulation. Following pinch-off, the axial force applied by the extended connector is effective for preparing the pinched-off sections of the tubulation, thus avoiding the presence, at the pinch-off of any substantial laterally directed forces which would adversely affect the cold-welded seal at the pinched-off region. Additionally, the extension of the connector prior to pinch-off can be predetermined for both controlling the magnitude of the axial stresses to be introduced into the tubulation and to compensate for any elongation of the tubulation resulting from the pinch-off operation. Also, the predetermined extension of the connector can be effected by first connecting the connector to the tubulation and then adjustably raising the platform supporting the device a predetermined amount. The flexible connector can advantageously comprise a bellows metallic sylphon tube in which case, if the system is being used for exhausting a device, atmospheric pressure external to the connector will tend to compress the sylphon axially and thereby assist in the separation of the pinched-off section of the tubulation.

Figure 2:
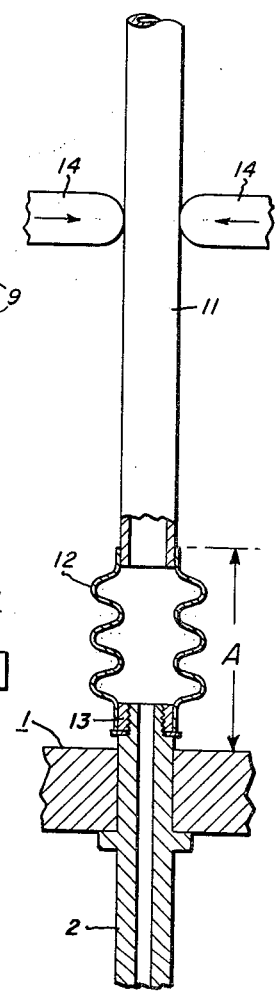
Figure 3:
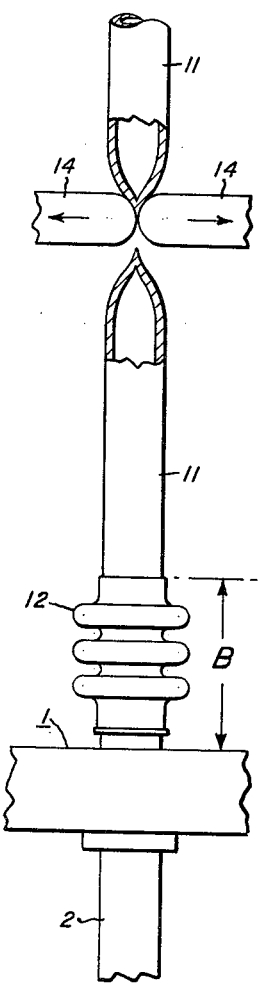

For a better understanding of the invention reference may be had to the accompanying drawing wherein:

FIGURE 1 is a partial schematic illustration of apparatus embodying the present invention whereby the method aspects of the invention may be practiced;

FIGURE 2 is an enlarged fragmentary sectional view of the apparatus of the invention illustrating the attachment and extension of the flexible connector whereby the connector is effective for introducing an axially directed tensile force in the tubulation; and FIGURE 3 is an enlarged fragmentary sectional view of the apparatus illustrating the manner in which the extended connector is effective at the pinch-off in separating the sealed sections of the tubulation.

Referring to FIGURE 1, there is illustrated a support table generally designated 1. Fitted and secured in a suitable aperture in the table 1 is one end of a conduit 2. The other end of the conduit 2 is suitably attached to operating means which can comprise either a vacuum system 3 or a fluid supply 4, depending upon whether the apparatus is to be employed in exhausting a device or charging same with a particular gaseous atmosphere.

Arranged above the table 1 is support means generally designated 5 and which can be mounted on the upper surface of the table 1. The support means 5 includes an adjustable platform 6 which can be vertically slidably mounted on four upstanding standards, or support legs 7. The standards 7 can be formed to include upper ends threaded as at 8 and each bearing a pair of threaded nuts 9. In this manner, the platform 6 can be adjustably positioned vertically above the table 1 by turning the lower ones of the nuts 9 to suitable positions on the standard 7. The upper ones of the nuts 9 can then be tightened against the platform for thereby locking the platform in any desired adjusted vertical position.

Platform 6 is adapted for supporting a device 10 bearing a tubulation 11 to be pinched off for thereby sealing the device. The tubulation 11 extends vertically downwardly toward the table 1 through an appropriate aperture (not shown) in the platform 6.

Suitably connected to the upper end of the conduit 2 is a flexible convoluted connector 12. The connector 12 is adapted for being flexible both longitudinally and laterally and preferably comprises a metal sylphon tube. Thus, the connector 12 is adapted for being extensible and retractable longitudinally and for being connected to the lower end of the tubulation 11, in the manner shown in FIGURES 1 to 3. Specifically, the flexible connector 12 is brazed to the end of the tubulation and, in turn, is connected to the end of conduit 2 by means of a nut 13 brazed into the other end of the flexible connector, as seen in FIGURES 2 and 3.

Employed with the above-described apparatus is means including a pair of clamping jaws 14 adapted for being moved together and apart on opposite sides of the tubulation 11 in the manner indicated by the arrows 15. Additionally, the jaws 14 are mounted for slight vertical movement to enable them to "ride with" or follow any elongation effects the pinch-off operation may have on the tubulation. Additionally, if the jaws are heavy they can be mounted with a spring support or counterbalance support so as to be effectively weightless in operating on the tubulation. When brought together the jaws 14 are adapted for crushing or compressing an intermediate section of the tubulation with a substantial force to thereby bring opposed sidewalls together, in a manner shown in FIGURES 2 and 3, and with a compressive force effective for fusing the walls together to effect a hermetic seal. Jaws 14 also pinch off or sever the excess portion of the tubulation located between the pinched-off region and the connector 12 and in the manner shown in FIGURE 3.

In effecting a tubulation pinch-off operation with the apparatus described according to the invention, a stress-strain curve is first taken on an unencumbered sylphon section while under vacuum and before it is sealed between the conduit 2 and the tubulation 11. In this manner it is determined to what extent the sylphon must be extended to provide a predetermined desired tension on the tubulation. This length will constitute the dimension designated A in FIGURE 2. Then the device bearing the tubulation 11 is mounted on the platform 6 and the sylphon 12 is connected in the above-described manner to the upper end of the conduit 2 which, as indicated above, is fixedly secured in the table 1, and the lower end of the dependent tubulation 11. Thereafter the platform 6 is adjusted vertically by turning the nuts 9 equal amounts upward until the sylphon 12 is extended to the length A which includes a small amount corresponding to the elongation that will result from plastic deformation in the material of the tubulation during the pinching off operation.

Then the device 10 is exhausted or gas-charged through the conduit 2, sylphon 12 and tubulation 11 in the conventional manner, following which the pinch-off operation is effected. The pinch-off operation is carried out by closing the jaws 14 to effect the pinch-off shown in FIGURE 3 and then moving the jaws apart after separation is effected. During this pinch-off operation, the sylphon tends to contract and assume the passive original length thereof illustrated and designated B in FIGURE 3. The tendency for the sylphon to contract results from both the flexibility thereof and the exertion of external atmospheric pressure when the internal pressure is below atmospheric. Thus, the sylphon introduces axial downwardly directed forces in the tubulation serving to provide a uniform distribution of stresses causing separation of the pinched-off excess section of the tubulation from the remaining sealed section. The application of uniform axial stresses serves to avoid tearing of the tubulation material and tends to insure a seal without abrupt irregularities in wall thickness.

While a specific embodiment of the invention has been shown and described it is not desired that the invention be limited to the particular form shown and described and it is intended by the appended claims to cover all modifications within the spirit and scope of the invention.

What is claimed as new and desired to be secured by Letters Patent of the United States is:

1. Apparatus for sealing a device including a tubulation adapted for being pinched off comprising means for supporting said device, operating means for effecting fluid flow through said tubulation, means for pinching off said tubulation, and an axially retractable and laterally flexing conduit means effective for both interconnecting said tubulation and said operating means and introducing axially directed stresses in said tubulation for separating the severed sections of said tubulation following pinch-off.

2. Apparatus for sealing a device including a tubulation adapted for being pinched off comprising support means for supporting said device in an elevated position with said tubulation in a depending position, means for pinching off said tubulation to effect sealing of said device, operating means for effecting fluid flow through said tubulation and located in spaced relation to said support means, a laterally flexible axially retractable conduit connector interconnecting said tubulation and said operating means, and said support means being adjustable to move said device relative to said operating means thereby to extend said connector for introducing axially directed stresses in said tubulation during operation of said means for pinching off said tubulation.

3. Apparatus for sealing a device including a tubulation adapated for being pinched off comprising, means for supporting said device, operating means for effecting fluid flow through said tubulation, means for pinching off said tubulation, and an extensible and retractable folding wall conduit connector effective for inter-connecting said operating means and said tubulation to provide fluid passage therebetween and for applying an axially directed force to said tubulation for moving the sealed sections of said tubulation apart longitudinally during and following the operation of said pinch-off means.

4. Apparatus for sealing a device including a tubulation adapted for being pinched off comprising, means for fixedly supporting said device, operating means for effecting fluid flow through said tubulation, means for pinching off said tubulation, and a longitudinally and laterally flexible bellows connector interconnecting said operating means and said tubulation and extended to introduce an axially directed stress in said tubulation for effecting movement of the sealed sections of said tubulation apart longitudinally during and following the operation of said pinch-off means.

5. Apparatus for sealing a container including a tubulation adapted for being pinched off according to claim 4, wherein the end of said flexible bellows connector opposite said device is fixed and said means for fixedly supporting said device is predeterminedly adjustably positionable for moving said device to extend said connector to introduce predetermined axial stresses in said tubulation.

6. Apparatus for sealing a device including a tubulation adapted for being pinched off according to claim 4, wherein said bellows is a metallic sylphon tube.

7. In the manufacture of a device requiring the sealing of a tubulation attached thereto, the steps of interconnecting the end of said tubulation with operating means adapted for effecting fluid flow through said tubulation with a laterally flexible, axially retractable conduit connector, moving said device and operating means relatively oppositely a distance effective for extending said connector axially a predetermined amount thereby to introduce a predetermined axial stress in said tubulation, and pinching off said tubulation with said stress therein so that said axially retractable connector retracts a portion of said tubulation for separation thereof.

8. In the manufacture of a device requiring the sealing of a tubulation attached thereto, the steps of interconnecting the end of said tubulation with operating means adapted for effecting fluid flow through said tubulation with a laterally flexible, axially extensible bellows connector, moving said device and operating means relatively apart a first distance effective for extending said connector axially a predetermined amount thereby to introduce a predetermined axial stress in said tubulation and a second distance effective for extending said connector a further amount thereby to adapt it for absorbing elongation of said tubulation resulting from a pinch-off operation, and pinching off said tubulation with said axial stresses therein so that said bellows connector is operative to retract a portion of said tubulation for separation in the pinch-off operation.

References Cited in the file of this patent

UNITED STATES PATENTS

| 2,264,282 | Ambrose | Dec. 2, 1941 |
| 2,427,597 | Garner et al. | Sept. 16, 1947 |
| 2,785,509 | Miller et al. | Mar. 19, 1957 |
| 2,940,231 | Chauvin | June 14, 1960 |